United States Patent [19]

Roberts

[11] 4,360,392

[45] Nov. 23, 1982

[54] SOLDER FLUX COMPOSITION

[75] Inventor: Daniel F. T. Roberts, Saffron Walden, England

[73] Assignee: International Standard Electric Corporation, New York, N.Y.

[21] Appl. No.: 227,896

[22] Filed: Jan. 23, 1981

Related U.S. Application Data

[63] Continuation-in-part of Ser. No. 154,265, May 29, 1980, abandoned.

[51] Int. Cl.$^3$ .............................................. B23K 35/34
[52] U.S. Cl. ...................................... 148/23; 148/24; 148/25
[58] Field of Search ..................................... 148/23–25

[56] References Cited

U.S. PATENT DOCUMENTS

| | | | |
|---|---|---|---|
| 3,467,556 | 9/1969 | Stayner | 148/25 |
| 3,575,738 | 4/1971 | Becker | 148/23 |
| 3,617,345 | 11/1969 | Brown | 148/23 |
| 3,748,191 | 7/1973 | Strauss | 148/23 |

*Primary Examiner*—P. D. Rosenberg
*Attorney, Agent, or Firm*—John T. O'Halloran; David M. Quinlan

[57] ABSTRACT

A solder flux composition comprises a mixture of sarcosine and tartronic or tartaric acid dissolved in water and an aliphatic alcohol. Typically the acid-sarcosine weight ratio lies within the range 90:10 to 30:70 and the solution may contain between 5 and 20 weight percent of solids. The flux is employed for tin/lead soldering of a range of metals and alloys including copper, nickel and nickel-iron. Bidegradation of the flux is inhibited by the inclusion of lead carbonate, phenol or salicylic acid in the composition.

14 Claims, No Drawings

SOLDER FLUX COMPOSITION

CROSS REFERENCE TO RELATED APPLICATIONS

This is a continuation-in-part of application Ser. No. 154,265 filed May 29, 1980.

BACKGROUND OF THE INVENTION

This invention relates to solder flux composition and in particular to flux compositions of the amino acid type for use with tin-lead type solders.

SUMMARY OF THE INVENTION

According to the invention there is provided a solder-flux composition, including sarcosine together with tartronic acid or tartaric acid, a solvent comprising water or a miscible mixture of water and one or more aliphatic alcohols, and a biologically effective proportion of an antibiodegradation agent comprising phenol or salicylic acid, or mixtures thereof, or lead carbonate, and wherein the weight ratio of acid to sarcosine is from 90:10 to 30:70.

DETAILED DESCRIPTION OF THE INVENTION

Tartronic acid which has the structural formula

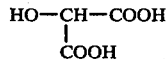

and tartaric acid which has the structural formula

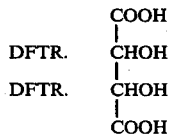

rapidly remove oxide surface films from metals such as copper, nickel, nickel-iron alloys and nickel-cobalt-iron alloys. Tartronic acid decomposes on melting to form an inert compound with substantially no fluxing power. Tartaric acid partly decomposes when melted and more so at soldering temperatures.

When these acids are used for soldering their high acidity causes rapid initial solder wetting even on aged and tarnished metal surfaces. However the decomposition reaction results in subsequent de-wetting of the solder coat at temperatures in the region of 230° C., i.e. at temperatures comparable with the tin-lead soldering temperature.

Sarcosine, which is an amino acid having the structural formula

has a good fluxing activity, but initial wetting by solder is relatively slow. The compound melts at 208° C. with some decomposition or polymerization although this does not substantially affect its fluxing action. The compound itself and its decomposition products are biodegradable and are only slightly corrosive to metals at temperatures below 70° C. The flux may be employed e.g. for soldering applications on printed circuit boards.

We have found that mixtures of tartronic acid or tartaric acid and sarcosine are particularly effective as solder fluxes when used with solders of the tin-lead type. Advantageously the two compounds are employed in a solution which is applied to a metal surface which is to be soldered. Typically the materials may be dissolved in water or a miscible mixture of equal volumes of water and one or more aliphatic alcohols. In particular a 40:60 (alcohol:water) volume mixture of water and isopropyl alcohol may be used for this purpose when tartronic acid is used. Less isopropyl alcohol may be used (under 30:70) with tartaric acid mixtures. The sarcosine is insoluble in isopropyl alcohol and excess alcohol addition results in partition into two immiscible liquids. Such a solution wets metal surfaces evenly thus ensuring an even coverage of flux prior to soldering.

If water is employed as the solvent a wetting agent, for example TRITON X-100, should be added to the solution to ensure even wetting of a metal surface, to which the solution is applied. Advantageously the wetting agent comprises between 0.01% and 0.1% by weight of the solution, or between 0.005% and 0.02% by weight of the solution, when TRITON is used.

The flux mixture must contain a sufficient proportion of sarcosine to suppress the de-wetting effect of the tartronic or tartaric acid decomposition products, this proportion varying from metal to metal. Advantageously the acid-sarcosine ratio should not exceed 90:10 parts by weight and should not be less than 30:70 parts by weight. A 50:50 mixture is suitable for most purposes.

A problem encountered with this organic flux composition is that of biodegradation by micro-organisms during storage before use. Biodegradation after use is a desirable feature. We have found that such biodegradation during storage is substantially prevented in the flux composition described herein by the addition of 0.002 to 0.005 weight percent, based on the weight of the flux of a suitable biocidal material. In particular we have found that the inclusion of lead carbonate in the flux composition strongly inhibits biodegradation, although more than 0.005% is insoluble in the flux.

In some circumstances however lead compounds are unsuitable owing to their poisonous nature, especially the danger of absorption through the skin. Where lead salts cannot be used a similar biocidal function can be provided by adding 0.001 to 1% by weight of phenol or salicylic acid or mixtures thereof to the flux composition, 0.1% being found adequate and without effect on subsequent flux residue removal.

The concentration of the solid flux in the solution must be adequate to ensure rapid solder coating of a metal surface to which the flux is applied. Clean copper is readily soldered with a 5 weight % solution, but for general purposes soldering of aged (room temperature oxidized) substrates a 10 to 20 weight % solution should be employed, and preferably 15%.

The residue remaining after soldering with the flux composition described herein is readily soluble in water. Thus, brushing the work while rinsing with clean water removes the residue together with any undecomposed flux. Brushing is not necessary if hot (70° C.) water to be used, with agitation such as jetting the water or mechanically shaking the soldered components.

It is found that, particularly when employing a 50:50 mixture of tartaric acid and sarcosine, the residue remaining after hot water rinsing and a subsequent rinse in cold distilled or de-ionized water is virtually nil. Exposure to damp heat such as is specified in BS 2011 tests C or D subsequent to washing discloses no corrosive residue remaining on part soldered copper test coupons.

The flux composition may be applied to an article to be soldered, e.g. a printed circuit board, by any conventional method. In particular the flux may be applied to a circuit board as a preferably non-stable foam, the board thereafter being subjected to a flow or wave soldering process. Following soldering the board is washed in water to remove any residual flux.

What is claimed is:

1. A solder flux composition, including an amount of tartronic acid or tartaric acid and an amount of sarcosine dissolved in a solvent comprising water or a miscible mixture of water and one or more aliphatic alcohols, wherein the weight ratio of said amount of acid to said amount of sarcosine is from 90:10 to 30:70 and said amount of sarcosine is sufficient to suppress the de-wetting effects of the decomposition products of said acid produced by heating said flux to soldering temperatures.

2. A solder flux composition as claimed in claim 1 further including a biologically effective proportion of an antibiodegradation agent comprising phenol or salicylic acid or mixtures thereof.

3. A solder flux composition as claimed in claim 2, wherein the antibiodegradation agent comprises 0.002 to 0.005 weight percent, based on the weight of the flux, of lead carbonate.

4. A solder flux composition as claimed in claim 2, wherein the antibiodegradation agent comprises 0.001 to 1.0 weight percent of phenol or salicylic acid or mixtures thereof.

5. A flux composition as claimed in claim 1 and wherein the solvent comprises a mixture of equal volumes of water and isopropyl alcohol.

6. The solder flux composition as claimed in claim 1 wherein the acid is tartronic acid and the solvent is a 40:60 volume mixture of isopropyl alcohol:water.

7. The solder flux composition as claimed in claim 1 wherein the acid is tartaric acid and the solvent is a mixture of isopropyl alcohol:water in a ratio by volume under 30:70.

8. A flux composition as claimed in claim 1 and in which the solution concentration is between 5 and 20 weight percent of solids.

9. A flux composition as claimed in any one of claims 1, 2, 3, 4, 5, 6, 7 or 8 and wherein the weight concentrations of sarcosine and acid are substantially equal.

10. A flux composition as claimed in claim 9 and in which the solution concentration is between 10 and 20 weight percent of solids.

11. A flux composition as claimed in claim 9 and in which the solution concentration is 5 weight percent of solids.

12. A flux composition as claimed in claim 10 and in which the solution concentration is 15 weight percent of solids.

13. A flux composition as claimed in claim 9 and which includes from 0.005 to 0.1 weight percent of a wetting agent.

14. A flux composition as claimed in claim 13 and in which the weight percent of wetting agent is between 0.005 and 0.02.

* * * * *